Figure 1:
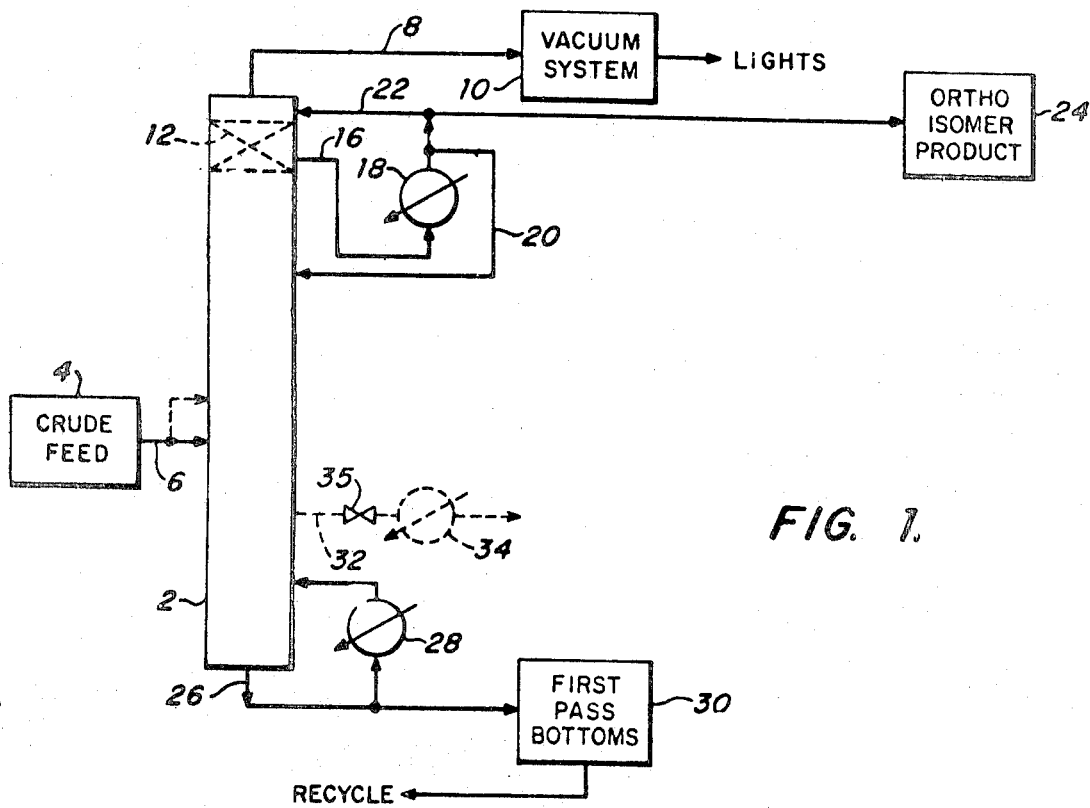

United States Patent

[11] 3,620,928

| [72] | Inventor | Constantine D. Miserlis |
| | | Arlington, Mass. |
| [21] | Appl. No. | 54,207 |
| [22] | Filed | July 13, 1970 |
| [45] | Patented | Nov. 16, 1971 |
| [73] | Assignee | The Badger Company, Inc. |
| | | Cambridge, Mass. |

[54] METHOD OF SEPARATING ISOMERS OF MONONITROTOLUENE
11 Claims, 3 Drawing Figs.

[52] U.S. Cl. .................................................. 203/6,
203/80, 203/91, 260/645
[51] Int. Cl. .................................................. B01d 3/34,
B01d 3/00, C07c 79/10
[50] Field of Search .......................................... 203/71, 73,
80, 6, 91; 260/645, 704; 23/266

[56] References Cited
UNITED STATES PATENTS

| 1,225,321 | 5/1917 | Flurscheim | 260/645 |
| 1,271,578 | 7/1918 | Johnson | 260/645 |
| 1,297,524 | 3/1919 | Wollenberg | 260/645 |
| 1,836,212 | 12/1931 | Weiland et al. | 260/645 |
| 2,430,421 | 11/1947 | Gage | 260/645 |

Primary Examiner—Norman Yudkoff
Assistant Examiner—David Edwards
Attorney—Schiller & Pandiscio

ABSTRACT: A method of separating isomers of mononitrotoluene by fractional distillation without need for crystallization equipment. Two embodiments are described, one using a single distillating column that is operated in a two-pass blocked out fashion, and the other using two series-connected distillation columns.

CONSTANTINE D. MISERLIS
INVENTOR.

BY Schiller & Pandiscio

ATTORNEYS.

METHOD OF SEPARATING ISOMERS OF MONONITROTOLUENE

This invention relates to separation of isomers of mononitrotoluene and more particularly to a method of separately recovering high purity ortho- and para-mononitrotoluene from a mixed mononitrotoluene feed.

Heretofore, recovery of high purity ortho- and para-mononitrotoluene from a mixture of the same with meta-mononitrotoluene obtained by direct nitration of toluene has been achieved by processes combining the steps of distillation, crystallization, centrifugation and drying. For example, recovery of high purity para-mononitrotoluene has been achieved in the past by taking a crude para fraction from a mixed mononitrotoluene crude and then subjecting that fraction to a crystallization step. However, the capital equipment costs for such a process are increased because of the need for separate distillation facilities or external condensers to separate out light volatile and noncondensable impurities. Moreover, while prior art processes permit recovery of high purity (99+percent) para- and ortho-isomers, yields in excess of 75 percent are difficult to achieve or are obtained only at relatively high cost because of the various steps involved and the care required to avoid explosions due to the presence of higher nitrated, and thus less stable, compounds in the mixed mononitrotoluene feed.

Accordingly, the primary object of this invention is to provide a new method of recovering high purity ortho- and para-mononitrotoluene from a mixed mononitrotoluene crude feed in yields which are in excess of those economically obtained by conventional combination distillation and single-step crystallization processes.

A further object is to provide a method of recovering high purity para-mononitrotoluene from a mixed mononitrotoluene stream without need for a crystallization stage.

A more specific object is to provide an economical method of recovering 99+percent pure ortho- and para-mononitrotoluene from a mixed mononitrotoluene feed from a direct nitration plant.

The foregoing and other objects hereinafter set forth or obvious to persons skilled in the art are achieved by a method that permits meta- and para-isomers to be separated by distillation alone. In a preferred embodiment of the invention separation of these isomers is accomplished by means of a single distillation column operating in a two-pass blocked out fashion. During the first-pass operation high purity ortho-mononitrotoluene liquid fraction is recovered and the para-isomer is recovered in a bottoms fraction. The bottoms fraction is used as the feed to the column in the second pass operation and the column is operated so that a liquid fraction rich in the meta-isomer is recovered from the op of the column and a pure para-isomer fraction is recovered as a sidestream close to the bottom of the column. In a second embodiment of the invention two series connected distillation columns are operated continuously rather than in blocked out fashion. The first column produces an isomer fraction, and a bottoms rich in the meta- and para-isomers. The second column using the first column bottoms as feed produces an overhead meta-isomer fraction, a high purity ortho-isomer fraction, and a nonvolatile residue bottoms fraction. In both embodiments the pure para-isomer is removed directly as a distillate product without the need for crystallization. An essential feature of the invention is allowing a portion of the para-isomer to remain with the bottoms residue to dilute and stabilize any higher nitrated compounds which may have been present in the crude mixed mononitrotoluene feed.

Figure 2:
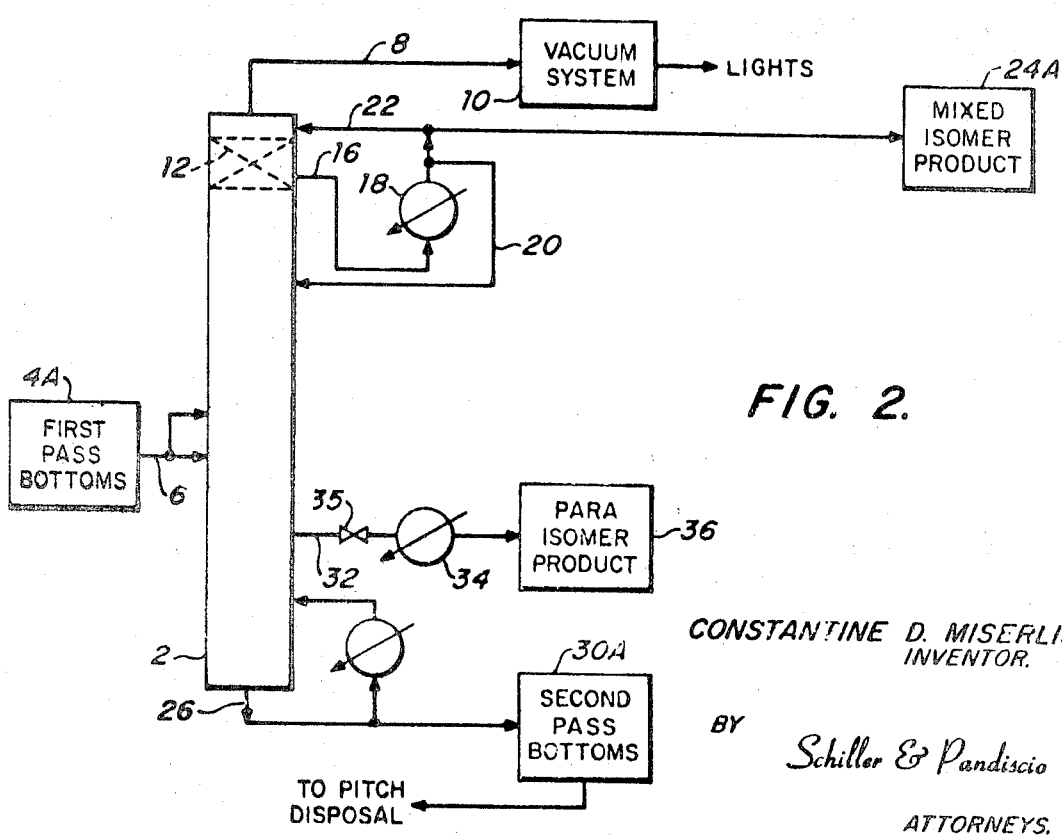
Figure 3:
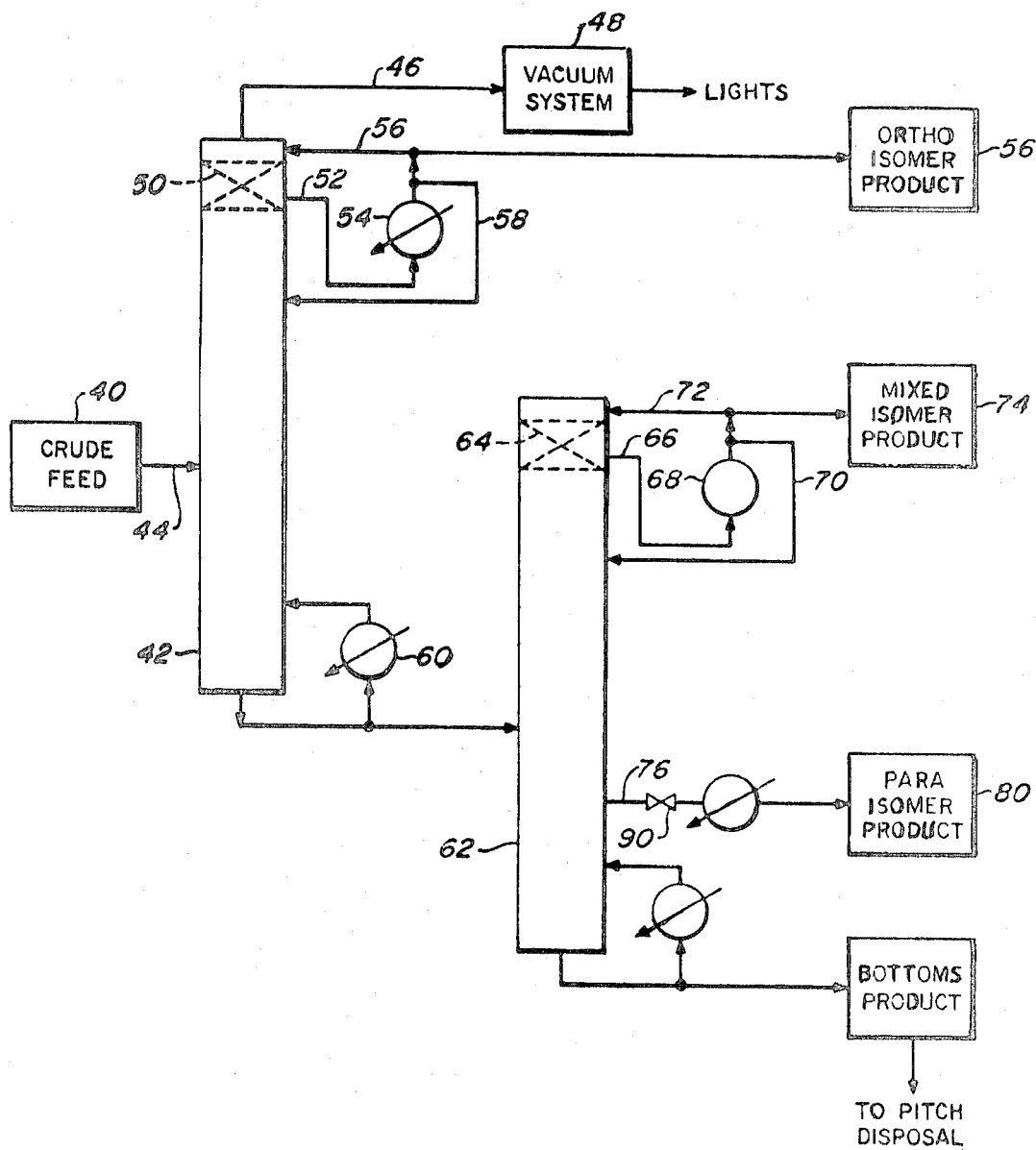

Other features and many of the attendant advantages of the invention are set forth or rendered obvious from the following detailed description which is to be considered together with the accompanying drawings wherein:

FIG. 1 relates to the preferred embodiment of the invention and illustrates the first-pass distillation operation;

FIG. 2 relates to the preferred embodiment of the invention and illustrates the second-pass distillation operation; and FIG. 3 illustrates the alternative embodiment of the invention.

Turning now to Fig. 1, the apparatus used in the first pass of the two-pass blocked out operation comprises a distillation column 2. A mixed nitrotoluene feed from a supply tank 4 is introduced to the column via a line 6. The upper end of the column is fitted with a line 8 for removing an overhead vapor fraction made up of toluene and noncondensed lighter compounds, plus a small amount of ortho-mononitrotoluene. Because the process is preferably carried out at a relatively low pressure in the column, the line 8 is connected to a suitable vacuum system 10 such as a vacuum pump to effect overhead fraction withdrawal. The upper end of the column is also provided with an internal condenser shown schematically at 12. An overhead liquid fraction which is essentially pure ortho-isomer is withdrawn from the condenser 12 via a line 16 and is cooled by means of a heat exchanger 18 through which cooling water is circulated. Part of the cooled liquid fraction is refluxed to the upper tray of the column via a line 20; another portion is passed back to the upper end of the condenser 12 via a line 22, and the remainder is passed to a collecting tank 24. A part of the bottoms fraction withdrawn via a line 26 is reboiled in a reboiler 28 through which a suitable fluid heating medium such as steam is circulated; the remainder is passed to a collecting tank 30 where it is stored until completion of the first-pass operation, after which it is recycled to the column for the second-pass operation. The bottoms fraction is rich in the para-isomer but contains a substantial amount of the meta-isomer and still lesser amounts of the ortho-isomer and higher nitrated compounds, notably dinitrotoluene.

Referring now to Fig. 2, in the second-pass operation the first-pass bottoms rich in the para-isomer is introduced to the column via line 6 from a supply tank 4A. An overhead vapor fraction is recovered via line 8 and bottoms fraction is recovered via line 26. A portion of this bottoms fraction is reboiled in reboiler 28 and recycled to the column, while the remainder is passed to a storage tank 30A. This collected bottoms fraction may be discarded since it is essentially pitch with minor amounts of the meta-, para- and ortho-isomers of mononitrotoluene. An overhead liquid fraction comprising a mixture of all three isomers is withdrawn from the top of the column via line 16. Some of this fraction is directed to a storage tank 24A while the remainder is recycled to the condenser 12 or refluxed to the upper tray of the column via lines 22 and 20. Still another liquid fraction is removed from the column as a sidestream at a level between the point of introduction of the feed and the bottom of the tank and is directed via a line 32 and a cooling heat exchanger 34 to a storage tank 36. This recovered liquid fraction is essentially pure para-mononitrotoluene. During this second-pass operation dinitrotoluene tends to build up in the bottoms fraction. Dinitrotoluene is unstable: therefore, to avoid the danger of explosion the concentration of dinitrotoluene is limited by material balance control. Essentially, this is achieved by controlling the rate of withdrawal of the para-isomer sidestream (e.g. by means of a valve 35) so as to allow more para-isomer to concentrate in the bottom of the tower and thereby dilute the dinitrotoluene so that its relative concentration is kept within safe limits, e.g., 10 percent concentration.

It is to be noted that the storage tank 4 (Fig. 1) may be used as the tank 4A in the second-pass operation, with the second-pass bottoms being transferred thereto from the tank 30 (Fig. 1) used to collect the first-pass bottoms. Similarly, the tank 30 (Fig. 1) may be used as tank 30A to collect the second-pass bottoms fraction. On completion of the first-pass operation, collecting tank 24 may be emptied of the ortho-isomer product and used to collect the mixed isomer product obtained in the second-pass operation, or else a separate tank 24A may be used for collection of the mixed isomer product.

Alternatively, the process may be carried out in a two-column system such as is shown in Fig. 3. In this case, the crude mixed mononitrotoluene feed is introduced from a source of supply 40 to a first distillation column 42 by way of a line 44. The source of supply 40 may be a storage tank or it may be considered to represent the continuous output of a direct toluene nitration plant. A light vapor fraction including toluene is withdrawn overhead by way of a line 46 connected to a suitable vacuum system 48. Substantially pure ortho-isomer liquid fraction is withdrawn via a line 52 from a condenser section 50 located in the upper end of the column. This liquid fraction is cooled in a heat exchanger 54 and then part of it is recycled to the condenser via a line 56, another part is refluxed to the top tray in the column, via a line 58, and the remainder is recovered as product and passed to a storage tank 56. The bottoms fraction subject to reboiling in a reboiler 60 as shown, is passed to a second column 62 where it is separated into three discrete fractions. A top liquid fraction is withdrawn via a line 66 from a condenser section 64 located in the upper end of the column and cooled in a heat exchanger 68. Portions of this fraction are refluxed to the upper tray of the column and recycled to the internal condenser via lines 70 and 72, while the rest is recovered as product and passed to a storage tank 74. This liquid fraction is rich in meta-nitrotoluene but also includes some of the ortho- and para-isomers. A sidestream fraction which is essentially pure para-isomer is withdrawn from column 62 via a line 76 and a cooling heat exchanger 78 and passed to a storage tank 80. A bottoms fraction is removed via a line 82; part of it is reboiled in a reboiler 84 and the remainder is recovered in a collecting tank 86. This bottoms fraction includes pitch and higher nitrated compounds. Because of the instability of the higher nitrated compounds (notably dinitrotoluene), the amount of para-isomer withdrawn via line 76 is controlled (e.g., by means of a valve 90) so as to allow an amount thereof sufficient to stabilize the higher nitrated compounds to appear in the bottoms product.

It is believed to be obvious that the processes carried out in the preferred and alternative embodiments just described are one and the same, except that the alternative embodiment permits continuous operation whereas the preferred embodiment is a batch process. Accordingly, the operating conditions for the column 2 in the first-pass operation are essentially the same as those for column 42 and the operating conditions for the column 2 in the second-pass operation are essentially the same as those for column 62.

In this connection, it is to be noted that the concentration of toluene in the liquid ortho-isomer product or in the overhead lights fraction can be controlled by adjusting the operating temperature of the internal overhead condenser 12 of distillation column 2 and the condenser 50 of column 42. Thus, the amount of toluene in the o-mononitrotoluene product may be reduced or substantially eliminated by running the overhead condenser hotter and also reducing the subcooling of the reflux; however, this reduction in toluene concentration produces a slight increase in the amount of ortho-isomer. Of course, if the ortho-mononitrotoluene product is to be subjected to hydrogenation in a subsequent process stage, a relatively high concentration (e.g., about 2–3 percent) of toluene in that product is not considered detrimental and may be tolerated since it is standard practice in the hydrogenation stage to add toluene to the ortho-isomer for stripping and decanting purposes.

The following example illustrates how the invention is carried out according to the preferred embodiment of the invention described in connection with Fig. 1 and 2. In this example, the distillation column 2 comprised 70 bubble-type trays (of course, other types of trays such as sieve or valve trays may be used in place of the bubble-type trays). For the first pass, the crude mixed mononitrotoluene feed was introduced to the 37th tray from the bottom, while the second pass feed was introduced to the 47th tray. On both passes, the upper liquid fraction was taken from the internal condenser section. On the second pass, the ortho-isomer product sidestream was taken from the fifth tray.

EXAMPLE

A mixed mononitrotoluene feed at a temperature of 104° F. was fed into the column 2 via line 6 at the rate of 2,550 pounds per hour. This feed consisted by weight of 2.6 percent toluene, 59.6 percent ortho-mononitrotoluene, 4.1 percent meta-mononitrotoluene, 33.3 percent para-mononitrotoluene and 0.4 percent dinitrotoluene. The column was operated so that pressure at its bottom end was approximately 207 mm./hg. and the pressure at its top end was approximately 21 mm./hg. The bottoms fraction recirculated through reboiler 28 was reheated by heat exchange with steam so as to maintain a temperature of 370° F. in the bottom of the column. The lights overhead fraction was vented via line 8 at a temperature of 98° F. and a rate of 41 pounds per hour. The liquid fraction removed from the internal condenser had a temperature of 146° F. and was cooled in exchanger 18 to a temperature of 106° F. About 1,521 lbs./hr. of this liquid fraction was recovered in tank 24. The remainder was returned to the condenser 12 and the topmost tray of the column at rates of 139,500 and 12,060 pounds per hour respectively. The overhead stream was removed via line 8, at a temperature of 98° F. and at a rate of 41 lbs./hr. About 988 lbs./hr. of bottoms fraction was drawn off and delivered to storage tank 30. This first-pass operation was continued until the supply of crude had been exhausted, a total time of about 72 hours. Then the bottoms product stored in tank 30 was reintroduced to the column via line 6 at a temperature of about 150° F. and at a rate of about 1,620 lbs./hr. During this second-pass operation, the pressure at the bottom of the tower was approximately 207 mm./hg. and the pressure at the top was about 21 mm./hg. The reboiler heat exchanger was operated with steam so as to maintain a temperature of 381° F. in the bottom of the column. The liquid fraction removed via line 16 had a temperature of 165° F. and was cooled in exchanger 18 to a temperature of 116° F. About 459 lbs./hr. of this liquid fraction was collected in tank 24A. The remainder was returned to condenser 12 and the top tray of the column at rates of 110,000 and 13,750 lbs./hr. respectively. The lights overhead stream was vented via line 8 at a temperature of 102° F. and a rate of 1 lb./hr. About 130 lbs./hr. of bottoms was delivered to storage tank 30A. The sidestream fraction drawn off from the fifth tray had a temperature of 369° F. and was cooled in exchanger 34 to a temperature of 200° F. During the latter part of the run, about 1,030 lbs./hr. of sidestream fraction was passed to storage tank 36. The second-pass operation was continued until all of the bottoms product from the first-pass operation had been fractionated. The following tables show in weight percent the relative compositions of the original crude feed and the product streams recovered in the first- and second-pass operations. The terms MNT and DNT designate mononitrotoluene and dinitrotoluene respectively.

FIRST PASS

|  | Feed | Overhead vapor fraction | Top liquid fraction | Bottoms fraction |
|---|---|---|---|---|
| Toluene | 2.6 | 75.6 | 2.4 |  |
| O-MNT | 59.6 | 24.4 | 97.6 | 2.5 |
| M-MNT | 4.1 |  |  | 10.5 |
| P-MNT | 33.3 |  |  | 86.1 |
| DNT | 0.4 |  |  | 0.9 |

SECOND PASS

|  | Overhead fraction | Top liquid fraction | Bottoms fraction | Side stream fraction |
|---|---|---|---|---|
| Toluene |  |  |  |  |
| O-MNT | 40.0 | 37.6 |  |  |
| M-MNT | 30.0 | 29.4 | 0.2 | 0.5 |
| P-MNT | 30.0 | 33.0 | 89.0 | 99.5 |
| DNT |  |  | 10.8 |  |

It is to be noted that in the foregoing table, the composition given for the second-pass bottoms are based on end-of-run conditions since the concentration of dinitrotoluene in that fraction was progressively increased during the run by progressively increasing the rate of sidestream product withdraw at the expense of bottoms removal. Consequently, the recovery of para-mononitrotoluene increased during the course of the run. Approximately 97.7 percent of the ortho-isomer in the original feed was recovered as product in storage tank 24 during the first-pass operation. The recovery of the para-isomer effected by the second-pass operation increased from 70 percent at the start of the run to 79 percent at the end of the run as a result of the increase in sidestream product withdrawal effected to increase the dinitrotoluene concentration in the second-pass bottoms. The purity of the ortho- and para-isomer collected in tanks 24 and 36 was approximately 100 percent and 99.5 percent respectively with respect to the other isomers but excluding water and toluene. As noted above, the amount of toluene present in the ortho-isomer product could have been decreased at the expense of a slightly increased loss of ortho-isomer.

It is to be appreciated also that the specific operating conditions set forth in the foregoing example may be varied somewhat without departing from the invention. For one thing, some of the operating temperatures and pressures and also the flow rates may be changed depending upon the composition of the crude feed, column design, and degree of purity and yield desired. Thus, the concentration of dinitrotoluene in the second-pass bottoms may be made still lower at the expense of para-isomer recovery but with more dinitrotoluene stabilization. Furthermore, it is to be noted that mixed mononitrotoluene feeds from a direct nitration plant often include small quantities of explosive sensitizers, primarily nitrophenols, in which case the rate of sidestream withdrawal on the second pass may be further decreased to dilute the bottoms fraction sufficiently to stabilize such sensitizers.

As indicated above, practice of the invention according to the alternative embodiment shown in FIG. 3 involves essentially the same operating conditions as those set forth above except that the process is continuous. While the two-column operation permits greater tolerance in column size and creates the possibilities of a more favorable heat duty, the single column two-pass operation involves substantially lower capital equipment costs. Both embodiments offer the advantage of separating isomers of mononitrotoluene without need for crystallization equipment.

Among the advantages of the invention are lower capital equipment costs, stabilization of higher nitrated compounds against explosive reactions and improved product quality. The stabilization is achieved by material balance control and this is necessary even though the column is run at a temperature below the decomposition temperature of dinitrotoluene. As to product quality, the para-isomer product is not only of high purity but it also is characterized by a clear pale yellow-green color. With prior processes, the para-isomer product is darker and not clear.

What is claimed is:

1. A method of processing a crude feed including a mixture of the isomers of mononitrotoluene to recover high-purity ortho- and para-mononitrotoluene comprising fractionally distilling said crude feed to produce a first bottoms fraction that is rich in para-mononitrotoluene and a first liquid fraction that, exclusive of any water and toluene that might be present therein, is substantially pure ortho-mononitrotoluene; recovering said first liquid fraction; fractionally distilling said first bottoms fraction to produce a second liquid fraction that is rich in meta-mononitrotoluene, a third liquid fraction that is substantially pure para-mononitrotoluene and a second bottoms fraction; and recovering said third fraction.

2. A method according to claim 1 wherein said crude feed also contains toluene and said first liquid fraction is recovered from the top section of a distillation column, and further wherein the temperature in said top end is controlled to control the amount of toluene appearing in said first liquid fraction.

3. A method according to claim 2 wherein the top section of said distillation column includes an internal condenser, and further including cooling part of said first liquid fraction and recycling the same to said condenser whereby to control the temperature in said top end.

4. A method according to claim 1 wherein said crude feed also includes a higher nitrated compound of toluene, and further including limiting the concentration of said higher nitrated compound in said second bottoms fraction to a value at which said compound is stabilized and will not explosively react.

5. A method according to claim 4 wherein the concentration of higher nitrated compound in said second bottoms fraction is limited by reducing the rate of recovery of said third liquid fraction.

6. A method according to claim 4 wherein said second bottoms fraction includes para-mononitrotoluene in an amount sufficient to dilute said higher nitrated compound to a relative concentration at which it is stabilized and will not explosively react.

7. A method according to claim 6 wherein the relative concentration of said higher nitrated compound in said second bottoms fraction is in the order of 10 percent by weight.

8. A method according to claim 7 wherein said crude feed and said first bottoms fractions are fractionally distilled in the same distillation column.

9. A method according to claim 8 wherein said first bottoms fraction is supplied to said distillation column as a feed after all of said crude feed has been fractionally distilled in said column.

10. A method according to claim 1 wherein said crude feed is distilled in a first distillation stage and said first bottoms fraction is distilled in a second distillation stage.

11. A method according to claim 1, wherein said fractional distillation is carried out at a reduced pressure.

* * * * *